G. W. HANSBROUGH.
LOCK CONNECTION FOR STRUCTURAL MEMBERS.
APPLICATION FILED SEPT. 23, 1912.

1,102,502.

Patented July 7, 1914.
2 SHEETS—SHEET 1.

Witnesses.
E. S. Lemme
S. Coustive.

Inventor:
George W. Hansbrough
by Wm. F. Booth
his Attorney

UNITED STATES PATENT OFFICE.

GEORGE W. HANSBROUGH, OF SAN FRANCISCO, CALIFORNIA.

LOCK CONNECTION FOR STRUCTURAL MEMBERS.

1,102,502. Specification of Letters Patent. Patented July 7, 1914.

Application filed September 23, 1912. Serial No. 721,748.

*To all whom it may concern:*

Be it known that I, GEORGE W. HANSBROUGH, a citizen of the United States, residing in the city and county of San Francisco and State of California, have invented certain new and useful Improvements in Lock Connections for Structural Members, of which the following is a specification.

My invention relates in general to building construction, and especially to structural-steel work; and it consists in the novel lock-connection for structural-members, which I shall hereinafter fully describe.

The general object of my invention is to provide a time and labor saving means, practically noiseless, for readily and effectively connecting, in the field, various members of any shape, such as columns, girders, beams, trusses, brackets, etc., used in buildings, bridges, wharfs, tunnels and other structures.

The nature of my invention and the manner of its application, together with its various uses and advantages will hereinafter fully appear, reference being had to the accompanying drawings in which—

Figure 1:
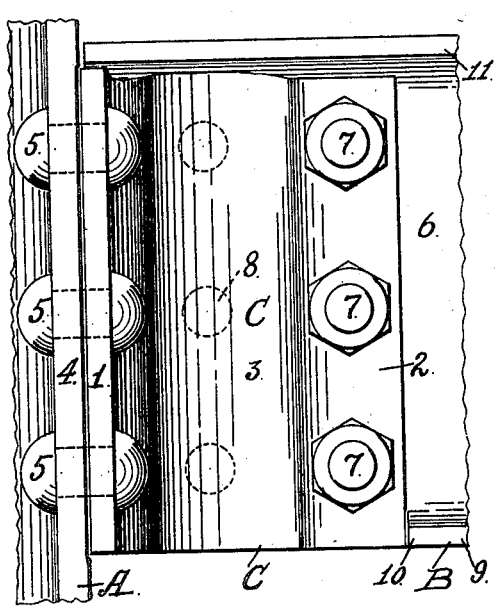
Figure 2:
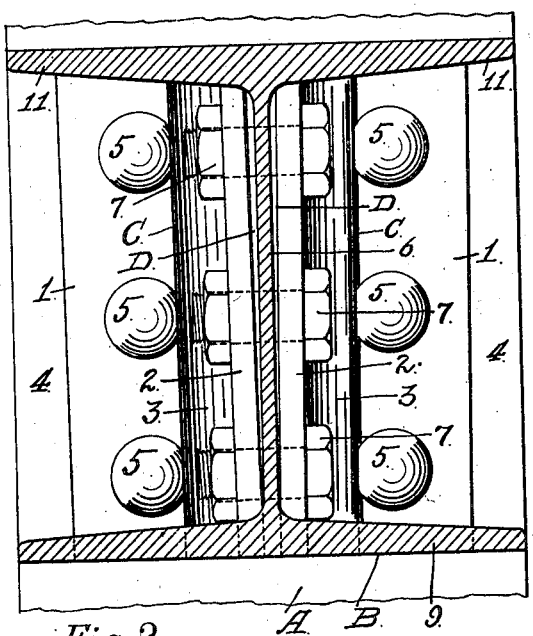
Figure 3:
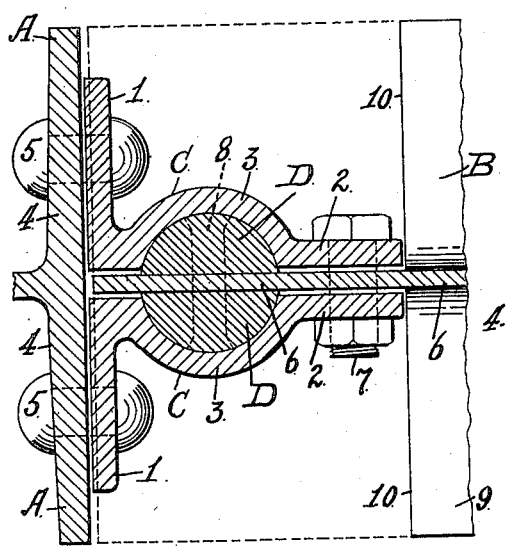
Figure 4:
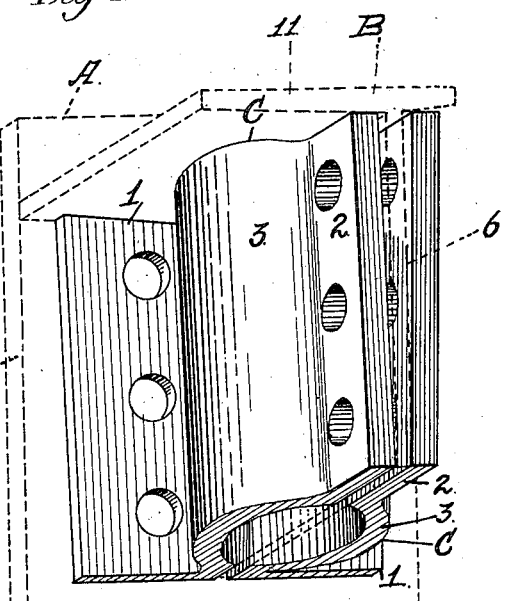
Figure 5:
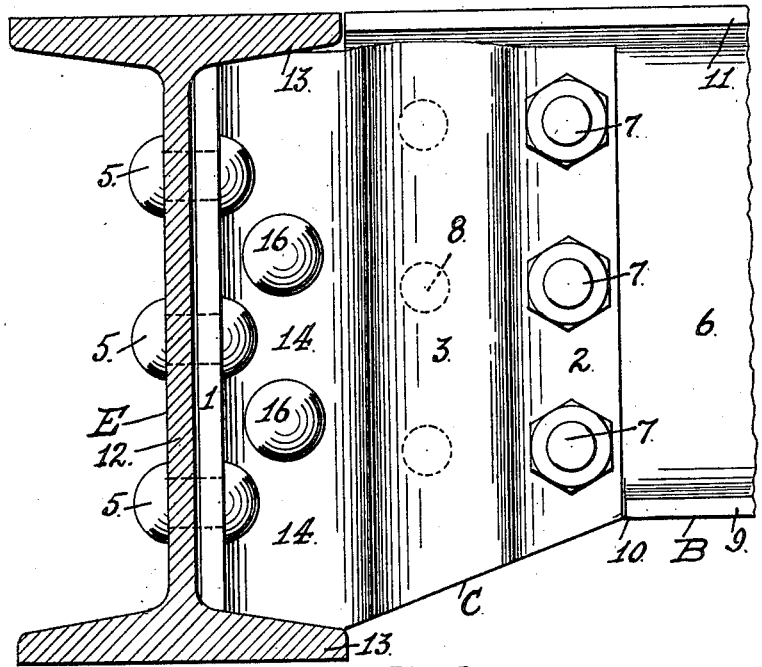
Figure 6:
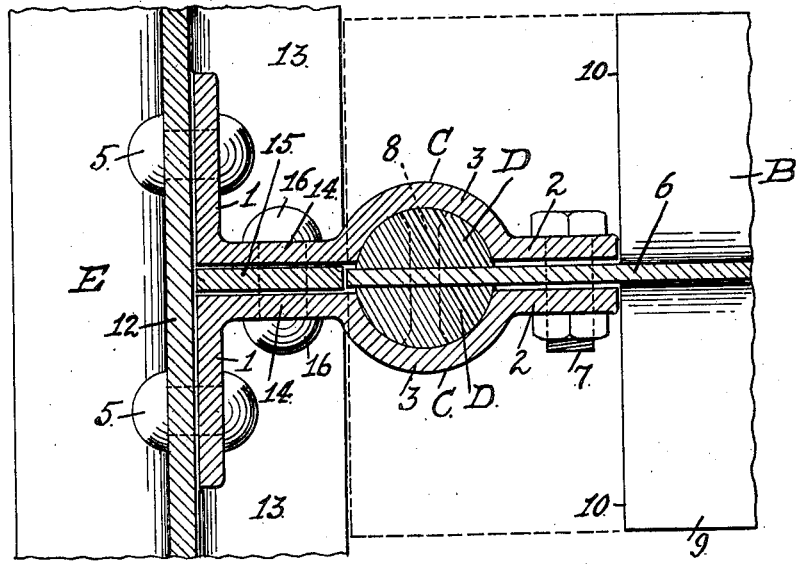

Figure 1 is a side elevation of my lock-connection showing it applied to a column and a girder. Fig. 2 is a front elevation of the same, the girder being in section. Fig. 3 is a horizontal section through the connection of Figs. 1 and 2. Fig. 4 is a perspective view of my said lock-connection, the column and girder being shown in dotted lines. Fig. 5 is a side elevation of my connection, showing it adapted for uniting one girder to another girder. Fig. 6 is a horizontal section of the connection of Fig. 5.

Referring to Figs. 1 to 4 inclusive, A is one structural member, here shown as a column of flanged section, and B is a second structural member, shown as an I-beam or girder. C indicates separated or spaced complemental plates which I shall herein term "clasps". Each clasp comprises an end portion 1 fashioned for initial connection with the flange 4 of the structural member A, as, for example, by the rivets 5; an opposite end portion 2 fashioned for subsequent connection with the web 6 of the structural member B, as indicated by the bolts 7; and a socket portion 3 intervening the end portions, said socket portion being of any sectional shape, here shown, for illustration as half-round. D indicates complemental pieces or bars which I shall herein term "bosses". These may be of any sectional shape to correspond to, and to enter and fit and fill the socket portions 3 of the clasps C, said bosses being here shown for the sake of illustration as half-round. The bosses D are riveted to the web 6 of the structural member B, one on each side, as is indicated in Fig. 3 by the dotted countersunk rivet 8. In making the connection, the web 6 of the member B and its bosses D are entered from above into the space between the clasps C, the bosses filling the socket formed by the socket portions 3 of said clasps; and in order to enable the member B to be thus slipped down between the clasps, the lower flange 9 of said member is either cut out to the contour of the parts projecting from the column member A, or, as here shown in Figs. 1 and 3, said lower flange 9 is wholly cut away back to the line indicated at 10, in order to clear said projecting parts. When the lock connection parts are in engagement, the ends 2 of the clasps are tightened up to the web 6 by the bolts 7. The member B, when thus slipped down to place may be supported, wholly or in part, by its top flange 11 upon the top of the clasps C, but, in practice, I prefer to make the engagement itself a supporting one, partly or wholly, and self-tightening, by the simple expedient of initially setting the spaced clasps C at an angle to each other, as clearly seen in Fig. 2, in such wise that the space between them narrows from the top to the bottom, thereby forming a downward tapering socket between their portions 3; in which case the bosses D will also be made to correspond, that is, to taper or narrow downward, which effect can be had either by planing off at an angle their inner faces which contact with the web 6 of member B, or by tapering their outer faces. By such a construction the member B will under its own weight tighten itself in its socket connection. The tops of the clasps C will be coped, that is, made to conform in outline, to the under surface of the upper flange 11 of the member B.

In Figs. 5 and 6, I show my lock-connection in the case of having to unite two girders. One of these girders is the same as the girder B of the previous figures. The other is indicated by E and takes the place of a supporting member. In such case, because the girder B cannot be brought up to the girder E in like proximity as if the latter were the column A, it is only necessary to project the clasps C far enough from the web 12 of said girder E to throw their socket portions 3 beyond the plane of the flanges 13 of said girder E. This is effected by forming said clasps C with inner extension portions 14. Further, in order to have a proper abutment for the end of the web 6 of the girder B, I place an abutment plate 15 (see Fig. 6) between said extension portions 14 and secure it by rivets 16. The clasps C in practice will preferably be of rolled steel cut to the required length and fitted to suit the conditions. They are riveted to the supporting member in the shop, and their other ends 2 are punched in the shop for subsequent bolting to the supported member in the field. The bosses D are preferably of rolled steel, and are riveted to the supported member in the shop, and said supported member will be punched in the shop for bolting the outer ends of the clasps C to it, in the field.

When the members have been properly equipped in the shop with their clasps and bosses they are taken to the field or work and are fitted together as above described by what may very properly be termed a field rivetless connection, the operation being practically noiseless, because all that has to be done when the lock is assembled is to tighten up the free end portions 2 of the clasps C, by the bolts 7 through the web 6 of the supported member B, thus insuring against any slipping or sliding motion and forming a rigid and tight lock-connection. This connection is adaptable for members set together at any angle and for members set in a rake, as rafters. Gusset plates and wind bracing devices may be attached to the frame by this connection.

The purpose and advantage of my lock-connection thus become apparent. It is economical and effective. It gives a close and firm contact of parts thereby presenting maximum resistance to stresses. As all work and riveting of the connections can be done in the shop, field riveting is eliminated, except for splicing of columns, and it, therefore, saves a large percentage of labor and time, and is, in fact, a field rivetless connection.

A particular advantage to be noted is that this connection brings the frame immediately into true alinement, during erection. No parts of the frame need temporary bolting or other attention, which is a saving in time and labor. It is often necessary to remove, replace or interchange parts after the frame is up; with my connection this becomes a simple and inexpensive operation, avoiding cost and the waste attendant upon demolishment, the parts being fit for use again.

With this connection the entire structure with possibly the exception of such work as has received field riveting, may be easily taken apart, removed and set up again.

The saving in cost resulting from the use of this connection will be a factor in inducing building in restricted districts.

I claim:—

1. A structural member lock-connection comprising a first structural member, a pair of opposing, spaced, complemental clasps connected at one end to said structural member, said clasps having on their inner surfaces a transverse socket, a second structural member of flanged section, the body of said member fitting between the clasps with its head flange lying across the upper edges thereof, and said body having side bosses fitting in the socket of the clasps, and means connecting the other ends of said clasps with the body of said second member.

2. A structural member lock connection comprising a first structural member, a pair of opposing, spaced, complemental clasps connected at one end to said member, said clasps having on their inner surfaces a transverse socket, a second structural member of flanged section having its foot flange cut out to permit the body of said member to pass between said clasps, said second member having its body fitted between said clasps with its head flange lying across the upper edges thereof, and said body having side bosses fitting in the socket of the clasps, and means connecting the other ends of said clasps with the body of said second member.

3. In a structural-member lock-connection the combination of a pair of opposing, spaced, complemental clasps each fashioned at one end for initial connection with the first structural member, and at the other end for subsequent connection with the second structural member, and fashioned between its ends with one half of a socket portion, said clasps being arranged in their initial connection with the first structural-member at an angle to each other to taper the socket space formed by their socket portions; and a boss connected with the second structural-member adapted to enter and fashioned to fit the inter-clasp tapering socket.

4. In a structural-member lock-connection the combination of a first structural member; a pair of complemental clasps fashioned at one end for initial connection with the first structural member and at their other end for subsequent connection with a second structural member, said clasps being relatively disposed at an angle to each other to leave a tapering space between them; a second structural member; and a pair of complemental bosses secured on opposite sides of said second structural member adapted to enter and fashioned to fit the tapering inter-clasp space.

5. In a structural-member lock-connection, the combination of a first structural-member; a pair of separated, complemental clasps, each composed of a plate having one end fashioned for initial connection with the first structural member and the other end fashioned for subsequent connection with the second structural member and also fashioned intermediate its ends with one half of a socket space; said clasps being arranged in their initial connection with the first structural member at an angle to each other to taper said socket space from one end to the other; a second structural member; and bosses secured to said second structural member adapted to enter and fashioned to fit the tapering socket space inclosed by said clasps.

In testimony whereof I have signed my name to this specification in the presence of two subscribing witnesses.

GEORGE W. HANSBROUGH.

Witnesses:
 WM. F. BOOTH,
 D. B. RICHARDS.